(12) United States Patent
Holbus

(10) Patent No.: US 6,795,995 B1
(45) Date of Patent: Sep. 28, 2004

(54) AUTOMATIC VEHICLE WASHING APPARATUS INCLUDING A MICROFIBER VEHICLE WASH STRIP

(76) Inventor: Edward Holbus, 1822 South St., Racine, WI (US) 53404

( * ) Notice: Subject to any disclaimer, the term of this patent is extended or adjusted under 35 U.S.C. 154(b) by 332 days.

(21) Appl. No.: 10/013,031

(22) Filed: Nov. 12, 2001

Related U.S. Application Data

(60) Provisional application No. 60/253,764, filed on Nov. 29, 2000.

(51) Int. Cl.[7] .................................................. B60S 3/04
(52) U.S. Cl. .......................... 15/97.3; 15/208; 15/230; 15/230.15; 15/DIG. 2
(58) Field of Search ........................ 15/97.3, 208, 230, 15/230.15, 230.16, DIG. 2

(56) References Cited

U.S. PATENT DOCUMENTS

| | | | |
|---|---|---|---|
| 3,650,281 A | | 3/1972 | Hurst |
| 4,852,199 A | | 8/1989 | Holbus |
| 5,249,325 A | | 10/1993 | Wilen |
| 5,375,289 A | * | 12/1994 | Miyaoka ..................... 15/230 |
| 5,413,128 A | | 5/1995 | Butts |
| 6,067,685 A | | 5/2000 | Holbus |
| 6,131,233 A | * | 10/2000 | Bolton et al. .............. 15/229.1 |
| 6,571,423 B1 | * | 6/2003 | Lijzenga et al. ............. 15/385 |

* cited by examiner

Primary Examiner—Randall Chin
(74) Attorney, Agent, or Firm—Quarles & Brady LLP

(57) ABSTRACT

An automatic vehicle washing apparatus which includes a wash mechanism and at least one wash strip having one end fixed to the wash mechanism. An exterior surface of the wash strip is formed from a microfiber fabric having fiber filaments of less than 1.00 denier. Preferably, the microfiber fabric encloses a sponge. Most preferably, the microfiber fabric includes between 70% and 80% polyester and between 20% and 30% polyamide.

2 Claims, 1 Drawing Sheet

AUTOMATIC VEHICLE WASHING APPARATUS INCLUDING A MICROFIBER VEHICLE WASH STRIP

CROSS REFERENCES TO RELATED APPLICATIONS

This application claims the priority benefit of U.S. Provisional Patent Application No. 60/253,764 filed on Nov. 29, 2000.

STATEMENT REGARDING FEDERALLY SPONSORED RESEARCH

Not Applicable.

1. Field of Invention

This invention relates to automatic vehicle washing, and particularly to an apparatus for automatically washing the exterior of an automobile or other similar vehicle using fabric including microfibers.

2. Background of Invention

Automatic vehicle washing apparatus is well known. The apparatus typically takes one of two generic forms. In one form, an automobile is moved by a conveyor through successive stations at which various washing operations take place, such as wetting, scrubbing and rinsing. The second approach is to automatically perform these same operations upon a stationary vehicle. The present invention is adaptable to both forms of washing apparatus.

A principal problem associated with all types of automatic car washes is the abrading that results to the surface of the vehicle during the scrubbing operation. The scrubbing is usually accomplished by rotating brushes that include relatively stiff bristles of synthetic resin material, or occasionally strips of fabric. In either case, the high speed action of the brushes against the surface of the vehicle contributes to scratching and abrading, particularly if there is insufficient water to lubricate the surface as the scrubbing occurs.

In a known automatic vehicle washing apparatus, wash strips are formed from cotton. The cotton has good water absorption characteristics, however it has a tendency to stretch after continued use which reduces the useful life of the strip. Therefore, a need exists for an automatic vehicle washing apparatus wash strip which has a low abrasion and stretch characteristics.

SUMMARY OF THE INVENTION

The present invention provides an automatic vehicle washing apparatus which includes a wash mechanism and at least one wash strip having one end fixed to the wash mechanism. An exterior surface of the wash strip is formed from a microfiber fabric having fiber filaments of less than 1.00 denier. Preferably, the microfiber fabric encloses a sponge. Most preferably, the microfiber fabric includes between 70% and 80% polyester and between 20% and 30% polyamide.

A general objective of the present invention is to provide an automatic vehicle washing apparatus which cleans a vehicle without damage to the vehicle. This objective is accomplished by providing an automatic vehicle washing apparatus having wash strips formed from microfiber fabric.

Another objective of the present intention is to provide a long lasting, self cleaning wash strip. This objective is accomplished by providing a wash strip having an exterior surface formed from microfiber fabric which encloses a sponge. The microfiber fabric is adapted to resist stretching to improve the strip useful life, and the sponge reverse cleans the fabric.

The foregoing and other objects and advantages of the invention will appear from the following detailed description. In the description, reference is made to the accompanying drawings which illustrate a preferred embodiment of the invention.

DETAILED DESCRIPTION OF THE PREFERRED EMBODIMENT

Figure 1:
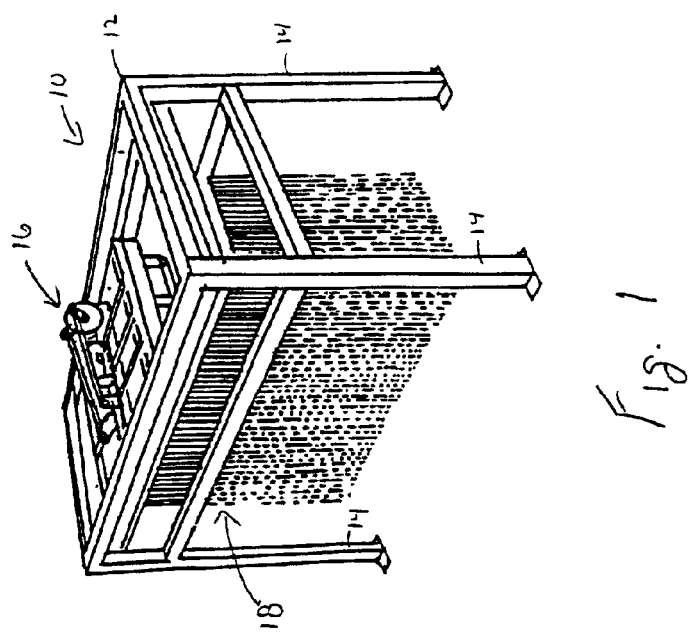
FIG. 1 is a perspective view of a vehicle wash apparatus in accordance with the present invention.

Referring to FIG. 1, the vehicle wash apparatus 10 includes a frame 12 supported at each corner by ground engaging legs 14. The frame 12 supports a vehicle wash mechanism 16 which washes a vehicle (not shown), such as a car, truck, and the like, moving beneath the frame 12 using reciprocating, elongated wash strips 18 and water. The water is sprayed onto the vehicle, and in cooperation with the reciprocating action of the strips, dislodges and rinses away dirt and grime on the vehicle. Although a frame 12 supported by ground engaging legs 14 is disclosed, the frame 12 can be supported above the moving vehicle using any method known in the art, such as by supports extending from a ceiling or side walls without departing from the scope of the claims.

The vehicle wash mechanism 16 horizontally reciprocates the water soaked absorbent wash strips 18 which are draped over the moving vehicle and reciprocated in the direction of vehicle travel using methods known in the art, such as disclosed in U.S. Pat. No. 4,852,199, which is incorporated herein by reference. In the present invention, the reciprocating motion of the strips 18 subject the surface of the vehicle to a lift motion of the soaked, and thus heavy, wash strips 18 which generates cleaning power for washing the vehicle. Advantageously, with the proper amount of water, the strips 18 float on the water, and nothing touches the vehicle surface other than the water.

Figure 2:
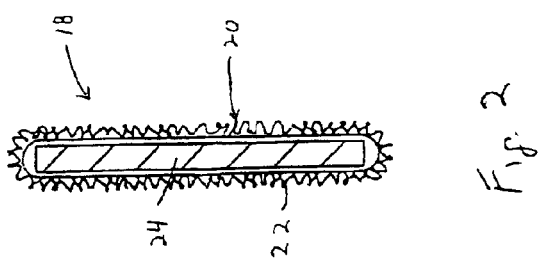
FIG. 2 is a cross sectional view of the wash strip of FIG. 1.

As shown in FIG. 2, the wash strips 18 include an external cover 20 formed from elongated lengths of a microfiber fabric 22. The multi-filament fibers of the microfiber fabric have a diameter of less than 1.0 denier per filament to provide a nonabrasive fabric which does not damage a vehicle finish. Microfiber fabric was first commercially availably in 1989, and is available in a wide variety of synthetic fibers. Preferably, the wash strips 18 used in the present invention include fabric containing between approximately 70% and 80% polyester and between approximately 20% and 30% polyamide which resists stretching and is nonabrasive, such as available from Edge Tech Industries, San Diego, Calif. Most preferably, the fabric is woven using a waffle weave which inhibits the strip from stretching and coiling during using.

Sponges 24 are enclosed in the cover 20 to provide self cleaning wash strips 18. The sponges 24 are fixed to the cover 20 using methods known in the art, such as sewing, and the like. Water penetrates both the microfiber fabric cover 20 and the sponges 24 to saturate the sponges 24 with the water. When the sponges 24 enclosed in the microfiber fabric cover 20 become saturated, as the sponges are compressed during the washing operation, water flows outwardly from the saturated sponges 24 enclosed within the washing strip 18. The outwardly flowing water forces out the dirt that collects on the microfiber fabric cover 20. This outflow of water from the sponges 24 reverse cleans the wash strip 18 to prevent buildup of dirt on the microfiber fabric cover 20. Advantageously, the sponges inhibit the strip from coiling.

A nonstretching core can also be enclosed in the fabric to inhibit stretching and coiling. Preferably, the core is a vinyl polyester sheet which can be easily sewn between strips of the microfiber fabric and sponges.

Figure 3:
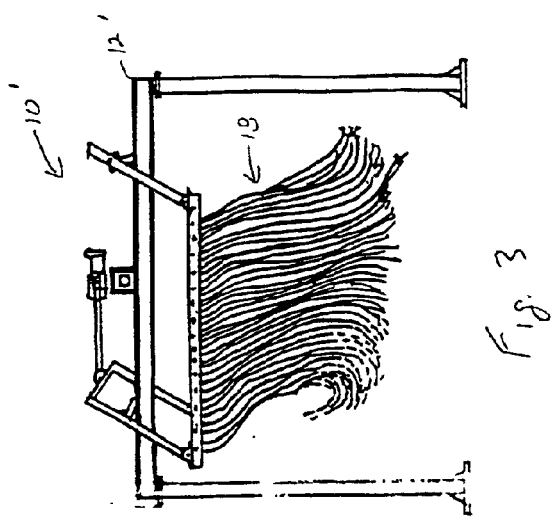
FIG. 3 is a perspective view of an alternative embodiment of the present invention.
Figure 4:
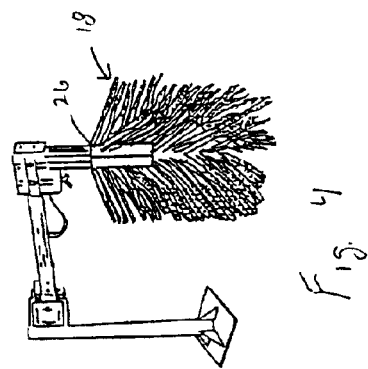
FIG. 4 is a perspective view of another alternative embodiment of the present invention.

The wash strips 18 can be incorporated into other vehicle wash apparatuses without departing from the scope of the present invention. For example, as shown in FIG. 3, the wash strips 18 can be incorporated in a vehicle wash apparatus 10' which reciprocates the wash strip 18 transverse to the direction of vehicle travel underneath the frame 12'. In another embodiment, shown in FIG. 4, each wash strip 18 has one end fixed to a rotatably mounted spindle 26 which rotates adjacent a vehicle to engage the washing strips 18 with the vehicle. Although a moving vehicle is disclosed for cleaning by the present invention, a stationary vehicle can be cleaned by mounting the vehicle wash mechanism on a moving frame using methods known in the art.

While there has been shown and described what are at present considered the preferred embodiments of the invention, it will be obvious to those skilled in the art that various changes and modifications can be made therein without departing from the scope of the invention defined by the appended claims.

I claim:

1. An automatic vehicle washing apparatus comprising:

a vehicle wash mechanism;

at least one wash strip having one end fixed to said vehicle wash mechanism, wherein an exterior of said wash strip is formed from a microfiber fabric having fiber filaments of less than 1.00 denier; and a sponge enclosed by said microfiber fabric.

2. The automatic vehicle washing apparatus as in claim 1 in which said microfiber fabric includes between 70% and 80% polyester and between 20% and 30% polyamide.

* * * * *

UNITED STATES PATENT AND TRADEMARK OFFICE
CERTIFICATE OF CORRECTION

PATENT NO. : 6,795,995 B1 Page 1 of 1
DATED : September 28, 2004
INVENTOR(S) : Holbus It is certified that error appears in the above-identified patent and that said Letters Patent is hereby corrected as shown below:

Column 4,
Line 15, -- surface -- should be inserted between "exterior" and "of"

Signed and Sealed this

Twenty-second Day of February, 2005

JON W. DUDAS
*Director of the United States Patent and Trademark Office*